United States Patent
West et al.

(10) Patent No.: US 12,425,325 B2
(45) Date of Patent: Sep. 23, 2025

(54) SYSTEM AND METHOD FOR DYNAMIC ROUTING AND SCALABLE MANAGEMENT OF ENDPOINT DEVICE COMMUNICATIONS

(71) Applicant: Sensus Spectrum, LLC, Morrisville, NC (US)

(72) Inventors: Ricky Wayne West, Raleigh, NC (US); John Brawner Duffie, III, Cary, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 161 days.

(21) Appl. No.: 18/363,315

(22) Filed: Aug. 1, 2023

(65) Prior Publication Data

US 2025/0047588 A1    Feb. 6, 2025

(51) Int. Cl.
*H04L 45/02* (2022.01)
*H04L 45/44* (2022.01)

(52) U.S. Cl.
CPC .............. *H04L 45/02* (2013.01); *H04L 45/44* (2013.01)

(58) Field of Classification Search
None
See application file for complete search history.

(56) References Cited

U.S. PATENT DOCUMENTS 11,811,645 B1 *  11/2023  Reth .................... G06N 20/00
2017/0201585 A1    7/2017  Doraiswamy et al.

FOREIGN PATENT DOCUMENTS

EP        3371989 A1      9/2018
WO    WO-2019018482 A1 *  1/2019 ........... G06F 9/5055

OTHER PUBLICATIONS

Sensus Spectrum LLC; International Search Report and the Written Opinion from PCT/US2024/028549, filing date May 9, 2024, with mailing date of Jul. 24, 2024.

* cited by examiner

*Primary Examiner* — William G Trost, IV
*Assistant Examiner* — Christopher P Cadorna
(74) *Attorney, Agent, or Firm* — Stanek Lemon Crouse & Meeks, PA (57) ABSTRACT

Described herein is a distributed endpoint processing system and method for managing and routing communications within the distributed endpoint processing system. The distributed endpoint processing system can dynamically accommodate additional endpoint devices or new endpoint types, enhancing flexibility and adaptability. By applying a customizable routing map generation policy, the distributed endpoint processing system assigns processing nodes for handling endpoint device communications, facilitating efficient and effective operation. Incoming messages from endpoint devices are processed and routed to the appropriate processing nodes based on the generated routing maps. Additionally, the distributed endpoint processing system can support API path configurations, which can be utilized to access and manage various system components.

18 Claims, 3 Drawing Sheets

SYSTEM AND METHOD FOR DYNAMIC ROUTING AND SCALABLE MANAGEMENT OF ENDPOINT DEVICE COMMUNICATIONS

FIELD

Various embodiments of the disclosure generally relate to data routing and management for electronic devices and, more particularly, to achieving efficient and scalable communication within advanced metering infrastructure systems and other connected device networks.

BACKGROUND

Electronic devices, such as water meters, gas meters, electric meters, and other endpoint devices, are commonly used to collect and transmit data related to measurements, usage, or performance. Advanced metering infrastructure (AMI) systems use communication infrastructure to manage and route the data collected from these endpoint devices. However, traditional approaches to communication infrastructure rely on pre-configured routing decisions, which can be inflexible, lack scalability, and provide limited support for different endpoint types. When changes are implemented to the infrastructure or message streams, these systems may struggle to accommodate the changes, resulting in operational disruptions and downtime. In some cases, integrating new devices may require a complete system restart, further adding to the potential for disruption.

SUMMARY

One or more embodiments herein relate to a method for managing communications in a distributed endpoint processing system based on endpoint and node characteristics. The method can include obtaining endpoint identifying information that can be indicative of at least one of an identity or a characteristic of an endpoint device within a distributed endpoint processing system. The endpoint identifying information can be broadcasted by the endpoint device as a part of one or more messages in response to introduction of the endpoint device into the distributed endpoint processing system. The method can include selecting a processing node from a plurality of processing nodes of the distributed endpoint processing system based on a routing map generation policy, the endpoint identifying information, and processing node information. The routing map generation policy can provide guidelines for utilizing the endpoint identifying information and the processing node information to select from the plurality of processing nodes. The processing node information can include at least one of processing capacity information, workload information, or geographical location information relating to one or more of the plurality of processing nodes. The method can include assigning the selected processing node to manage communications from the endpoint device. Assigning can include generating a routing map that associates the selected processing node with the endpoint device. Subsequent to the assignment, communications from the endpoint device can be routed within the distributed endpoint processing system to the processing node.

The method of the preceding paragraph can include one or more of the following steps or features. The routing map generation policy can be a second routing map generation policy. The method further can include prior to obtaining endpoint identifying information and during runtime of the plurality of processing nodes, obtaining an indication of the second routing map generation policy; and replacing or modifying a first routing map generation policy to generate the second routing map generation policy. Prior to obtaining the indication of the second routing map generation policy, one or more routing maps can be generated according to the first routing map generation policy. In some cases, none of the processing nodes are required to restart in order to accommodate the replacing or modifying of the first routing map generation policy. The method can include receiving one or more messages and extracting the endpoint identifying information from the one or more messages. The endpoint device can include at least one of a sensor, meter, monitoring equipment, control equipment, or communication device configured to collect, analyze, or transmit data within the distributed endpoint processing system.

The method of any of the preceding paragraphs can include one or more of the following steps or features. The method can include acquiring real-time metrics associated with the plurality of processing nodes. The processing node information can include the real-time metrics. The method can include prior to selecting the processing node, consulting a database storing existing routing maps that associate endpoint devices with respective processing nodes of the plurality of processing nodes. Selecting the processing node can be based on an absence of an entry for the endpoint device in the database. The method can include maintaining a route management database for all endpoint devices in the distributed endpoint processing system. The route management database can include associations between specific endpoint devices and corresponding processing nodes of the plurality of processing nodes. The method can be executed without necessitating software restart or revalidation. A dynamic data dispatcher can receive one or more messages from the endpoint device and extract the endpoint identifying information.

The method of any of the preceding paragraphs can include one or more of the following steps or features. The method can include transmitting an indication of the routing map to a dynamic data dispatcher. The dynamic data dispatcher can update its cache to include the indication of the routing map. For subsequent communications from the endpoint device, the dynamic data dispatcher can forward the subsequent communications to the processing node based on the routing map. The endpoint identifying information can include at least one of an endpoint device identifier, a device type, a firmware version, or a customer location. The routing map generation policy can specify that processing nodes can be selected based on a balance of processing capacity across the plurality of processing nodes. The routing map generation policy can specify that processing nodes can be selected based on geographical proximity to the endpoint device. The routing map generation policy can specify that processing nodes can be selected based on the device type of the endpoint device. The routing map generation policy can specify that processing nodes can be selected based on a combination of processing capacity, geographical proximity, and device type.

One or more embodiments herein relate to a system for managing communications in a distributed endpoint processing system based on endpoint and node characteristics. The system can include a processor configured to obtain endpoint identifying information that can be indicative of at least one of an identity or a characteristic of an endpoint device within a distributed endpoint processing system. The endpoint identifying information can be broadcasted by the endpoint device as a part of one or more messages in response to introduction of the endpoint device into the distributed endpoint processing system. The processor can be configured to select a processing node from a plurality of processing nodes of the distributed endpoint processing system based on a routing map generation policy, the endpoint identifying information, and processing node information. The routing map generation policy can provide guidelines for utilizing the endpoint identifying information and the processing node information to select from the plurality of processing nodes. The processing node information can include at least one of processing capacity information, workload information, or geographical location information relating to one or more of the plurality of processing nodes. The processor can be configured to assign the selected processing node to manage communications from the endpoint device. Assigning can include generating a routing map that associates the selected processing node with the endpoint device. Subsequent to the assignment, communications from the endpoint device can be routed within the distributed endpoint processing system to the processing node.

The system of the preceding paragraph can include one or more of the following steps or features. The routing map generation policy can be a second routing map generation policy. The processor can be further configured to prior to obtaining endpoint identifying information and during runtime of the plurality of processing nodes, obtain an indication of the second routing map generation policy; and replace or modify a first routing map generation policy to generate the second routing map generation policy. Prior to obtaining the indication of the second routing map generation policy, one or more routing maps can be generated according to the first routing map generation policy.

One or more embodiments herein relate to non-transitory computer readable media that can include computer-executable instructions that, when executed by a computing system of a distributed endpoint processing system, cause the computing system to obtain endpoint identifying information that can be indicative of at least one of an identity or a characteristic of an endpoint device within a distributed endpoint processing system. The endpoint identifying information can be broadcasted by the endpoint device as a part of one or more messages in response to introduction of the endpoint device into the distributed endpoint processing system. The computing system can select a processing node from a plurality of processing nodes of the distributed endpoint processing system based on a routing map generation policy, the endpoint identifying information, and processing node information. The routing map generation policy can provide guidelines for utilizing the endpoint identifying information and the processing node information to select from the plurality of processing nodes. The processing node information can include at least one of processing capacity information, workload information, or geographical location information relating to one or more of the plurality of processing nodes. The computing system can assign the selected processing node to manage communications from the endpoint device. Assigning can include generating a routing map that associates the selected processing node with the endpoint device. Subsequent to the assignment, communications from the endpoint device can be routed within the distributed endpoint processing system to the processing node.

The non-transitory computer readable media of the preceding paragraph can include one or more of the following steps or features. The routing map generation policy can be a second routing map generation policy. The computing system can be configured to, prior to obtaining endpoint identifying information and during runtime of the plurality of processing nodes, obtain an indication of the second routing map generation policy, and replace or modify a first routing map generation policy to generate the second routing map generation policy. Prior to obtaining the indication of the second routing map generation policy, one or more routing maps can be generated according to the first routing map generation policy.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

The present disclosure relates to a distributed endpoint processing system and method for managing and routing communications within the distributed endpoint processing system, addressing several challenges in modern networked environments. Electronic devices, such as water meters, gas meters, electric meters, and other endpoint devices, collect and transmit data related to measurements, usage, or performance. Advanced metering infrastructure (AMI) systems use communication infrastructure to manage and route data collected from these endpoint devices. However, traditional approaches have limitations in terms of flexibility, scalability, and support for different or new endpoint types, leading to potential operational disruptions and downtime. When changes are implemented to the infrastructure or message streams, these systems may struggle to accommodate the changes, potentially resulting in operational disruptions and downtime. In some cases, integrating new devices may require a complete or partial system restart, further adding to the potential for disruption.

To address these and other concerns, described herein is a distributed endpoint processing system and method for managing and routing communications within the distributed endpoint processing system. The distributed endpoint processing system can dynamically accommodate additional endpoint devices or new endpoint types, enhancing flexibility and adaptability. By applying a customizable routing map generation policy, the distributed endpoint processing system assigns processing nodes for handling endpoint device communications, facilitating efficient and effective operation. Incoming messages from endpoint devices are processed and routed to the appropriate processing nodes based on the generated routing maps. Additionally, the distributed endpoint processing system can support Application Programming Interface (API) path configurations, which can be utilized to access and manage various system components.

The distributed endpoint processing system can include a route management system for managing communications within a distributed endpoint processing system. The route management system can leverage a routing map generation policy, which can incorporate various routing rules, instructions, or criteria to determine the appropriate processing node(s) for handling endpoint device communications. The routing map generation policy can be adapted and/or customizable to suit the specific needs and requirements of the distributed endpoint processing system, providing improved scalability and resource utilization. By using a combination of endpoint-based and/or processing node-based routing rules, the distributed endpoint processing system can offer a dynamic, flexible, and nuanced approach to assigning endpoint devices to processing nodes, ensuring efficient and effective operation.

Application of the routing map generation policy can advantageously enable a distributed endpoint processing system to accommodate additional endpoint devices or new endpoint types without significantly affecting the operational stability of existing endpoint processing. For example, in some cases, additional endpoint devices or new endpoint types may be incorporated into the distributed endpoint processing system without necessitating a restart or retest of processing nodes handling existing endpoint devices or endpoint types. The routing map generation policy is used to assign endpoint devices to processing nodes by employing endpoint-based and/or processing node-based routing rules, instructions, or criteria. Endpoint-based rules can consider factors such as the type, location, priority, or metadata analysis of the endpoint devices, while processing node-based rules can consider factors such as the processing capacity, load, or geographical location of the processing nodes. In response to the addition of new devices, new routing maps can be dynamically generated based on the routing map generation policy, ensuring assignment of new endpoint devices to suitable processing nodes, and reducing potential disruptions in existing endpoint processing.

In some cases, the routing map generation policy can be customizable, thereby allowing for dynamic adjustment of routing decisions and integration of new routing rules, instructions, or criteria tailored to the specific needs and requirements of additional endpoint devices or new endpoint types. During runtime of the processing nodes or other components, system administrators or other authorized personnel can review and modify the routing map generation policy to accommodate various updates. By incorporating adjustments to the routing map generation policy, the routing decisions can be adjusted to accommodate any to-be-added or existing endpoint devices. This promotes efficient resource utilization and reduces the impact on the operational stability of the distributed endpoint processing system, while ensuring that new and existing endpoint devices are routed to the appropriate processing nodes according to their specific needs.

The disclosed distributed endpoint processing system can be flexible and responsive to changes in endpoint types such that software updates can be performed across new and existing endpoint devices and/or processing nodes without or with few issues, reducing downtime and increasing the overall efficiency of the distributed endpoint processing system. This adaptability can enable the distributed endpoint processing system to quickly respond to the addition of new endpoint types or the modification of existing endpoint types, fostering a robust and efficient communication infrastructure that can meet the demands of diverse endpoint devices and applications. Furthermore, in some cases, the distributed endpoint processing system can maintain a high level of performance and reliability, without the need for disruptive restarts or retests of the processing nodes handling existing endpoint types.

The disclosed distributed endpoint processing system can leverage cloud-ready technologies, enabling integration with modern infrastructure. An endpoint processing system can operate in parallel, processing messages from multiple endpoint devices concurrently, resulting in increased processing speed. The distributed endpoint processing system can process messages sent to and received from endpoint devices with high reliability, as well as support a stateful processing model, where localized access to endpoint data (e.g., encryption keys) is provided. This can ensure secure and accurate communication within the distributed network, allowing for efficient management of various endpoint devices.

The disclosed distributed endpoint processing system can include an endpoint proxy manager that can facilitate communication between various components of the distributed endpoint processing system and external entities. The endpoint proxy manager can act as an intermediary, ensuring that API requests from the processing nodes, a dynamic data dispatcher, or a platform manager are efficiently managed and routed to the appropriate destinations. By implementing API path specifications, the endpoint proxy manager can effectively direct API calls to the correct management APIs of the processing node instances, the dynamic data dispatcher, or the platform manager. This can streamline the communication process within the distributed endpoint processing system, enhancing performance and scalability of the distributed endpoint processing system.

In light of the description herein, it will be understood that the embodiments disclosed herein substantially improve network scalability, resource utilization, and adaptability to dynamic changes in the distributed endpoint processing system. For example, the customizable routing map generation policy can enable the distributed endpoint processing system to adapt to new endpoint types without disrupting existing endpoint processing and without requiring system restarts, while the combination of endpoint-based and/or processing node-based routing rules provides a dynamic, flexible, and nuanced approach to assigning endpoint devices to processing nodes.

Thus, the presently disclosed embodiments represent an improvement at least in the functioning of distributed endpoint processing systems by addressing challenges related to network scalability, resource utilization, and adaptability to dynamic changes in the distributed endpoint processing system. This approach can ensure that the distributed endpoint processing system operates efficiently and effectively, meeting the demands of connected devices and applications, while avoiding or reducing the need for a restart or retest when introducing new endpoint types or processing capabilities. By implementing an adaptable routing map generation policy, the distributed endpoint processing system can accommodate new endpoint types, software updates, and processing requirements, reducing downtime and increasing the overall efficiency of the distributed endpoint processing system. Furthermore, the dynamic assignment of processing nodes based on a routing map generation policy can reduce or eliminate the need for manual assignment, thereby promoting efficient resource utilization.

System Overview

Figure 1:
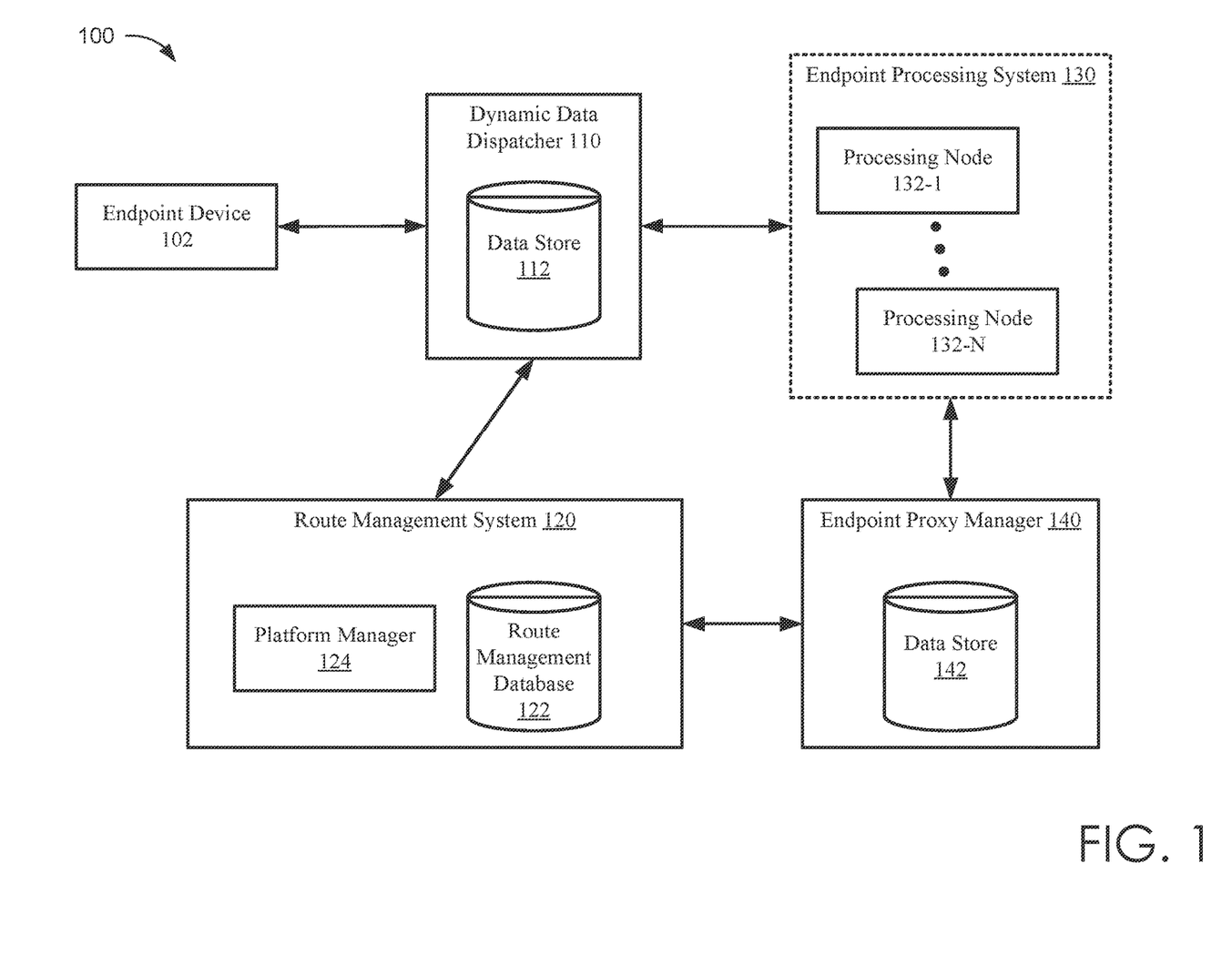
FIG. 1 illustrates one or more embodiments of a distributed endpoint processing system.

FIG. 1 illustrates an embodiment of a distributed endpoint processing system 100 that includes an endpoint device 102, a dynamic data dispatcher 110, a route management system 120, an endpoint processing system 130, and an endpoint proxy manager 140. To simplify discussion and not to limit the present disclosure, FIG. 1 illustrates only endpoint device 102, though multiple endpoint devices may be part of the distributed endpoint processing system 100. In some cases, one or more of the endpoint device 102, the dynamic data dispatcher 110, the route management system 120, the endpoint processing system 130, or the endpoint proxy manager 140 may be excluded or separate from the distributed endpoint processing system 100.

Any of the components or systems of the distributed endpoint processing system 100 may communicate via a network (not shown) or multiple distinct and/or distributed networks. The network can include any type of communication network. For example, the network can include one or more of a wide area network (WAN), a local area network (LAN), a cellular network (e.g., LTE, HSPA, 3G, and other cellular technologies), an ad hoc network, a satellite network, a wired network, a wireless network, and so forth. In some embodiments, the network can include the Internet. Any of the components or systems of the distributed endpoint processing system 100 may be implemented using individual computing devices, processors, distributed processing systems, servers, isolated execution environments (e.g., virtual machines, instances, etc.), shared computing resources, or so on. Furthermore, any of the foregoing components or systems of the distributed endpoint processing system 100 may be combined and/or may include software, firmware, hardware, or any combination(s) of software, firmware, or hardware suitable for the purposes described. For example, in some cases, the dynamic data dispatcher 110 and/or the endpoint proxy manager 140 are part of the route management system 120.

The endpoint device 102 can include, but is not limited to, a sensor, meter, or other Internet of Things (IoT) device that collects data and sends it to the dynamic data dispatcher 110, the route management system 120, and/or the endpoint processing system 130 for processing or collection. Although FIG. 1 illustrates only one endpoint device 102, it will be appreciated that the distributed endpoint processing system 100 may include any number of endpoint devices 102, such as tens, hundreds, thousands, or millions of endpoint devices 102. Endpoint devices 102 can be deployed in various environments, including smart homes, buildings, or utility services, to collect data on temperature, humidity, energy usage, water flow, or other relevant metrics. In some cases, the endpoint device 102 is implemented in software, such as an isolated execution environment, like a virtual machine or instance, or as a web service or database.

When active and implemented in the distributed endpoint processing system 100, the endpoint device 102 can transmit one or more messages. The messages can include metric information relating to various data collected or measured by the endpoint device 102. In addition or alternatively, the messages can include endpoint identifying information including details or metadata relating to the endpoint device 102 such as, but not limited to, device type, meter type, product type, unique device identifier, location information, radio endpoint identifier, customer identifier, firmware identifier or other information relating to the endpoint device 102. As described herein, the metric information and/or the endpoint identifying information can be used to assign that endpoint device 102 to a processing node 132 for handling communications from that endpoint device 102.

The dynamic data dispatcher 110 is responsible for managing the data flow between the endpoint devices 102 and the appropriate processing nodes 132 of the endpoint processing system 130. The dynamic data dispatcher 110 can be implemented as a software component, such as a software component that resides on a server or group of servers within the distributed endpoint processing system 100. The dynamic data dispatcher 110 can be implemented as a hardware component, such as a dedicated appliance or hardware device. In some such cases, the hardware device can be designed to handle high volumes of data and perform routing and processing tasks efficiently. The hardware component can include specialized processors and memory that enable it to quickly process and route data from endpoint devices to the appropriate processing nodes.

The dynamic data dispatcher 110 can work in conjunction with the route management system 120 to ensure that data is routed to the appropriate processing nodes 132 in a timely and efficient manner. The dynamic data dispatcher 110 can communicate with the route management system 120 to receive updates to the routing maps, such as when a new endpoint device is added or an existing endpoint device is removed, modified, or reassigned to a different processing node. These updates can be used to maintain up-to-date routing maps (sometimes referred to as routing information) and ensure that data is sent to the appropriate processing nodes.

The dynamic data dispatcher 110 can include a data store 112, which can be a local data store or cache. The data store 112 can store a copy of the routing maps stored in the route management database 122 of the route management system 120. This can allow the dynamic data dispatcher 110 to quickly access routing information without having to communicate with the route management system 120 each time it receives a message from an endpoint device 102. The data store 112 can include or be implemented as cloud storage, such as Amazon Simple Storage Service (S3), Elastic Block Storage (EBS) or CloudWatch, Google Cloud Storage, Microsoft Azure Storage, InfluxDB, etc. The data store 112 can be configured to provide high availability, highly resilient, low loss data storage. The data store 112 can include Amazon CloudWatch metrics. In some cases, to provide the high availability, highly resilient, low loss data storage, the data store 112 can store multiple copies of the data in the same and different geographic locations and across different types of data stores (e.g., solid state, hard drive, tape, etc.).

In some cases, the dynamic data dispatcher 110 provides an ingestion interface that allows for the ingestion of data from external sources into the distributed endpoint processing system 100, such as from endpoint devices 102. In some such cases, the ingestion interface can accept various types of data in different formats and protocols. Upon ingestion, the dynamic data dispatcher 110 can process and route the data to the appropriate processing nodes 132 within the endpoint processing system 130. The ingestion interface can be designed to handle large amounts of data and ensure high availability and fault tolerance.

When an endpoint device 102 is added to the distributed endpoint processing system 100, the endpoint device 102 may be configured to broadcast one or more messages that include endpoint identifying information. The dynamic data dispatcher 110 can receive these messages from the endpoint device 102, extract endpoint identifying information, determine whether the data store 112 includes an entry for the endpoint device 102, and, when no entry is present, forward the endpoint identifying information to the route management system 120. Alternatively, the dynamic data dispatcher 110 can forward the messages to the route management system 120, and the route management system 120 can extract the endpoint identifying information from the messages. The route management system 120 can use the endpoint identifying information to create or update the routing maps.

The route management system 120 is responsible for managing the routing maps between endpoint devices 102 and processing nodes 132 of the endpoint processing system 130. The route management system 120 can be implemented as a software component, such as a software component that resides on a server or group of servers within the distributed endpoint processing system 100. In addition or alternatively, the route management system 120 can be implemented as a hardware component, such as a dedicated appliance or hardware device.

The route management system 120 obtains endpoint identifying information and uses the endpoint identifying information to assign a processing node 132 to the endpoint device 102. For example, the route management system 120 can receive the endpoint identifying information from the endpoint devices 102 through or from the dynamic data dispatcher 110, such as from a forwarded message received by dynamic data dispatcher 110 from the endpoint device 102. In some cases, the route management system 120 receives forwarded messages from the dynamic data dispatcher 110, and the route management system 120 extracts the endpoint identifying information from the messages.

The route management system 120 manages the routing maps between endpoint devices and processing nodes within the distributed endpoint processing system 100. For example, the route management system 120 can maintain a route management database 122 with information relating to mappings (sometimes referred to as routing maps) between endpoint devices 102 and processing nodes 132. In the event the number of endpoint devices 102 changes (e.g., an endpoint device 102 fails or is removed from service, or an endpoint device 102 is created or add), the route management system 120 can be used to modify one or more of the routing maps in response to the change.

The route management system 120 can be communicatively coupled to one or more components of the distributed endpoint processing system 100, such as any combination of one or more of the endpoint devices 102, the dynamic data dispatcher 110, the endpoint processing system 130, or the endpoint proxy manager 140. For example, the route management system 120 can receive or communicate endpoint identifying information, routing map information, routing map identifiers, route generation policy information, processing node identifiers, specifications, or availability, etc. from one or more components of the distributed endpoint processing system 100 and can maintain at least some of this information in the route management database 122.

In certain embodiments, the route management system 120 manages data relating to endpoint devices 102 in the distributed endpoint processing system 100. For example, the route management database 122 can maintain a unique or different endpoint device identifier for each endpoint device 102. If an endpoint device 102 becomes unresponsive or unavailable, the route management system 120 can update the route management database 122 by removing the associated endpoint device identifier or updating a table to reflect its unavailability. Conversely, if a new endpoint device 102 is detected or instantiated, the route management system 120 can add an endpoint device identifier associated with it to the route management database 122. This can ensure that the route management database 122 provides current and accurate information on the availability and inclusion of endpoint devices 102. Additionally, the route management system 120 can obtain or retain status identifiers of endpoint devices 102 and receive updates regarding their availability or unavailability. These endpoint device identifiers or status identifiers can be kept up to date by receiving status updates or "heartbeats" from the endpoint devices 102 or the dynamic data dispatcher 110.

In some cases, the route management system 120 can manage assignments between endpoint devices 102 and processing nodes 132 of the distributed endpoint processing system 100. For example, the route management system 120 can create or manage routing maps, which can indicate assignments between endpoint devices and processing nodes for processing or otherwise handling of data or communications from those endpoint devices. The routing maps can specify endpoint(s) to processing node assignments or endpoint to processing node(s) assignments. For example, a first routing map can specific an associated between a first processing node and a first endpoint device, indicating that the first processing node is assigned to handle data or communications from the first endpoint device.

In some cases, the route management system 120 can manage the data of the distributed endpoint processing system 100 using a combination of the routing maps and data interrelationship maps. As a non-limiting example, a routing map can indicate an assignment of a first endpoint device to a first processing node, and a data interrelationship map can indicate an association between the first processing node and a plurality of endpoint devices, including the first endpoint device. In some such cases, based on the association of the first endpoint device with the first processing node and/or the association of the first processing node with the plurality of endpoint devices, the route management system 120 can use the routing map and the data interrelationship map to determine that the first processing node is to be responsible for first endpoint device.

The route management system 120 can maintain the route management database 122. The route management system 120 can populate the route management database 122 and/or update it over time with the data that it determines from the endpoint devices 102, the dynamic data dispatcher 110, the endpoint processing system 130, or the endpoint proxy manager 140. For example, as information changes, the route management system 120 can update the route management database 122. In this way, the route management database 122 can retain an up-to-date database of information.

The route management database 122 can store information relating to the endpoint devices of the distributed endpoint processing system 100. In some embodiments, this information can include, but is not limited to, endpoint device identifiers, processing node identifiers, routing maps, data interrelationship maps, routing map generation policy information, or processing node specifications. The route management database 122 can be maintained (for example, populated, updated) by the route management system 120. The route management system 120 and route management database 122 can be separate or independent of the endpoint device 102. Furthermore, the route management database 122 can be separate from or included in, or part of, the route management system 120. In other cases, the route management database 122 may be copied across many instances of distributed endpoint processing system 100. For example, the data store 112 of the dynamic data dispatcher 110 and/or the data store 142 of the endpoint proxy manager 140 may include instances of the route management database 122.

A routing map can indicate one or more assignments of endpoint devices 102 to processing nodes 132. For example, the routing map can indicate an assignment of a first endpoint device to a first processing node. The route management system 120 can generate and/or modify routing maps and/or assignment entries in routing maps according to a routing map generation policy. The routing map generation policy can indicate how to distribute/assign endpoint devices 102 to processing nodes 132. The routing map generation policy can indicate various routing rules, instructions, or criteria useful to identify the processing node(s) that should handle communication from a specific endpoint. The route management system 120 can dynamically generate a routing map based on the routing map generation policy, which allows for the assignment of a processing node to the endpoint device 102. By utilizing the routing map generation policy, the route management system 120 can intelligently distribute endpoint devices 102 to processing nodes 132 in a manner that is efficient and effective.

In some cases, the routing map generation policy may indicate to determine a processing node assignment based on endpoint information received from (e.g., broadcasted by) the endpoint device 102. For example, the routing map generation policy can indicate to assign processing nodes to endpoint devices based on metadata received from the endpoint device 102. The metadata can include, but is not limited to, a radio endpoint ID, customer ID string, device type, meter type, product type, or firmware version. As an example, the routing map generation policy may indicate to assign all endpoint devices within a family of related endpoint devices (e.g., endpoint devices of the same type) to a first processing node to ensure that communications from the family of related endpoint devices are always routed to the same processing node, providing consistent processing. Alternatively, the routing map generation policy may indicate to assign the endpoint to a processing node that is geographically closer to the customer's location based on the customer ID string, reducing latency, and improving response times. In another example, the routing map generation policy may indicate to assign the endpoint to a processing node that is best equipped to handle that specific type of endpoint device based on a device type. Similarly, the routing map generation policy may indicate to assign the endpoint device 102 to a processing node 132 that has expertise in processing a specific type of data based on the meter type or product type. As another example, the routing map generation policy may indicate to assign the endpoint to a processing node that has the latest software updates and can handle the most up-to-date communication protocols based on the endpoint's firmware version. By using endpoint metadata in this way, the route management system 120 can ensure that communications and data from each endpoint are handled efficiently and effectively, improving the overall performance of the distributed endpoint processing system 100.

In some cases, the routing map generation policy may indicate that the route management system 120 should assign a processing node based on processing node data received from the first processing node or other processing nodes. For example, the processing node data can include information about the processing capacity, available resources, and/or workload of one, some, or all of the processing nodes. The route management system 120 can use this information to determine which processing node is best suited to handle the communication from the endpoint device 102. In some implementations, the processing node data may also include information about the location of the processing node(s), such as its proximity to the endpoint device or other relevant factors. By considering the processing node data during routing map generation, the route management system 120 can enhance the routing of communications and data within the distributed endpoint processing system 100.

In some cases, the routing map generation policy may specify the use of round-robin or random assignment methods to distribute processing nodes among endpoint devices. This can help balance the workload across the processing nodes and prevent any single processing node from becoming overloaded. As another example, in some cases, the routing map generation policy may not specify a particular order for assigning processing nodes to endpoint devices.

The routing map generation policy can indicate one or more routing rules. The routing rules can be instructions or criteria used to determine the processing node that should handle the communication from a specific endpoint. For example, the routing map generation policy can indicate to apply routing rules to the endpoint identifying information, considering factors such as the type of endpoint, its location, and specific processing requirements.

In some cases, a routing map may associate multiple processing nodes to the same endpoint device. For example, the routing map can indicate an assignment of a first endpoint device to a first processing node and at least one second processing node. In some such cases, the assignments can be tiered assignments, such that one assignment takes precedence over the other assignment. For example, in some cases, the assignment of the first endpoint device to the first processing node can be a primary assignment, where the first processing node is assigned the primary responsibility of handle the communications associated with the first endpoint device, and the assignment of the first endpoint device to the one or more second processing nodes can be secondary assignments, where the one or more second processing nodes are assigned a secondary responsibility of handling the communications associated with the first endpoint device, should the first processing node fail or otherwise become unavailable.

A non-limiting example of a data structure for storing a routing map is illustrated in Table 1.

TABLE 1

| Routing map ID | Endpoint device ID | Processing Node ID |
|---|---|---|
| 15 | A423 | 7JRFZ |
| 19 | 2226 | 34LE |
| 24 | B603 | 90NC |

In the example illustrated by Table 1, the routing maps indicate various assignments of endpoint devices to processing nodes. In particular, the first routing map with routing map identifier 15 indicates that the endpoint device A423 is to be handled by processing node 7JRFZ. In other words, the first routing map indicates that the data associated with endpoint device A423 is assigned to the processing node 7JRFZ. The second and third routing maps indicate that the endpoint devices 2226 and B603 are to be handled by processing nodes 34LE and 90NC, respectively. As shown, the routing map includes routing map identifiers 15, 19, 24, which can be unique to particular routing map. In some cases, the routing map identifiers may provide an indication of useful information, such as when a map was created. It will be appreciated that a particular routing map may include one or more endpoint device-processing node assignments. For example, although described as separate routing maps, all three routing maps of Table 1 could be part of the same routing map.

The route management system 120 can include a platform manager 124. The platform manager 124 can be responsible for adding, deleting, and/or overall management of the processing nodes 132 within the distributed endpoint processing system 100. This management can extend to the orchestration of creating/instantiating new processing nodes 132, the deletion of processing nodes 132, or the execution of system-wide changes in response to fluctuating workloads or alterations in operational policies.

The platform manager 124 can communicate with the route management system 120 to invoke changes to the routing maps. These changes may be responsive to shifts in the operational landscape, including the expansion or contraction of the endpoint processing system 130. For instance, consider a scenario where a new endpoint device is integrated into the distributed endpoint processing system 100. In such a case, the platform manager 124 can invoke a route reassignment to ensure these new endpoint devices 102 are accommodated in the existing routing maps. Consequently, data flow and communication between these new endpoint devices 102 and the appropriate processing nodes 132 are efficiently established. In some cases, the platform manager 124 can update or add new policies, thereby facilitating management of policies associated processing nodes 132.

The platform manager 124 can oversee the lifecycle of processing nodes 132, from their inception and integration into the distributed endpoint processing system 100, to their removal if/when they are no longer required. In this way, the platform manager 124 can maintain the scalability and adaptability of the distributed endpoint processing system 100. As demand fluctuates, or as policy directives change, the platform manager 124 can ensure the distributed endpoint processing system 100 can effectively respond and adjust to these variations.

In some cases, the platform manager 124 can interface with various system components, including an HTTP API-Gateway dispatcher. For example, the platform manager 124 can assist in responding to requests from the dynamic data dispatcher 110, which can utilize a REST API for this communication. The platform manager 124 can aid in performing route entry lookups, the results of which can be cached by the dynamic data dispatcher 110 in a local route table cache for efficient access. In situations where the dynamic data dispatcher 110 receives a request for an endpoint without a valid route entry, the platform manager 124 can play a role in facilitating the return of an HTTP 404 response. This approach can maintain the integrity of the system by preventing the creation of dynamic routes for such requests. Furthermore, the platform manager 124 can facilitate proxy access to its management APIs through the dynamic data dispatcher 110. The dynamic data dispatcher 110 can support additional API path specifications, enabling it to proxy access not only to the platform manager 124, but also to the management APIs of the processing nodes 132 and the endpoint proxy manager 140. In this manner, the platform manager 124 can aid in enhancing the system's robustness and effectiveness, ensuring seamless communication and coordination across the distributed endpoint processing system 100.

Although FIG. 1 illustrates the platform manager 124 as being within the route management system 120, the platform manager 124 may be separate from the route management system 120. For example, the platform manager 124 can serve as a higher-level orchestrator, interfacing with multiple components like the route management system 120, the endpoint processing system 130, the dynamic data dispatcher 110, or the endpoint proxy manager 140.

The endpoint processing system 130 is responsible for processing data received from the endpoint devices 102. The endpoint processing system 130 includes one or more processing nodes 132-1 . . . 132-N (individually or collectively referred to as processing node 132 or processing nodes 132). Each processing node 132 can be responsible for processing data from one or more endpoint devices 102.

The processing nodes 132 can be implemented as software components, such as those that run on one or more servers within the distributed endpoint processing system 100. In some cases, each processing node 132 can be configured to perform one or more specific types of processing tasks based on the data received from endpoint devices 102. For example, one processing node 132 might be responsible for performing data aggregation, while another might be responsible for performing analytics.

The endpoint processing system 130 communicates with the dynamic data dispatcher 110 and the endpoint proxy manager 140 to receive data from the endpoint devices 102. When an endpoint device 102 broadcasts or sends a message, the dynamic data dispatcher 110 receives the message and extracts identifying information from it. The dynamic data dispatcher 110 then determines the appropriate processing node 132 based on routing maps and forwards the data to that processing node 132.

The endpoint processing system 130 includes one or more processing nodes 132 that are responsible for processing data received from the endpoint devices 102. The processing nodes 132 can be instances of software components, such as services, applications, or microservices, that run on a server or group of servers within the distributed endpoint processing system 100. The processing nodes 132 can also be instances of hardware components, such as dedicated appliances or devices. In some cases, processing nodes can be spun up (instantiated) or spun down depending on the current workload or other factors. The endpoint processing system 130 communicates with the dynamic data dispatcher 110 and the endpoint proxy manager 140 to receive and send data. For example, the processing nodes 132 can communicate with the dynamic data dispatcher 110 to receive data from the endpoint devices 102 and with the endpoint proxy manager 140 to send processed data to external systems or other components within the distributed endpoint processing system 100.

The processing nodes 132 can be responsible for executing algorithms or data processing tasks on the data received from the endpoint devices 102, and for generating outputs or responses to be sent back to the endpoint devices 102 or to other components of the distributed endpoint processing system 100. The processing nodes 132 can be managed and/or monitored by the route management system 120, which can reassign endpoint devices 102 to different processing nodes 132 based on changes in the distributed endpoint processing system 100 or the characteristics of the devices.

Once the data is processed by the processing nodes 132, the data can be stored in a data store, such as a database or data warehouse, for later analysis or retrieval. The processed data can also be sent back to the endpoint devices 102 or external entities, such as user applications or other systems, via the endpoint proxy manager 140.

The endpoint proxy manager 140 can act as an intermediary between external entities and the endpoint processing system 130 and/or the endpoint devices 102 themselves. The endpoint proxy manager 140 can provide a unified API for external entities to interact with the distributed endpoint processing system 100, encapsulating the complexity of the endpoint processing system 130. The endpoint proxy manager 140 can communicate with the route management system 120 to determine the appropriate processing node for each endpoint device (e.g., using routing maps), and uses a data store 142 to cache routing maps and other information for faster access. The endpoint proxy manager 140 can provide a layer of abstraction between external entities and the endpoint processing system 130, allowing for more efficient and effective communication. By presenting a unified API to external entities, the endpoint proxy manager 140 can shield these entities from the complexity of the underlying endpoint processing system 130, enabling them to interact with the endpoint processing system 130 more easily and with less risk of errors or inconsistencies. The endpoint proxy manager 140 can support additional API path specifications that enable it to proxy access to management APIs of the endpoint processing system 130 (e.g., the processing node instances), the dynamic data dispatcher 110, or the route management system 120, and can facilitate endpoint-specific proxy connections to the processing node instances. By encapsulating the endpoint processing system 130 and providing a unified API, the endpoint proxy manager 140 helps to simplify the distributed endpoint processing system 100 and make it more accessible to external entities, while also improving system performance and security.

As a nonlimiting example, when an external entity sends a request to the endpoint proxy manager 140, the endpoint proxy manager 140 can extract an endpoint device ID from the request and can query the data store 142 to determine the appropriate processing node(s) for that endpoint device. As described, the data store 142 caches routing maps and other information from the route management system 120 and allows the endpoint proxy manager 140 to quickly access the routing maps and other information without having to query the route management system 120 each time. The data store 142 (e.g., a local data store) can be periodically updated with the latest routing maps and other information from the route management system 120. However, if the data store 142 does not have the information, or it is deemed inaccurate or stale, the endpoint proxy manager 140 can query the route management system 120 to determine the appropriate processing node(s) for that endpoint device. The endpoint proxy manager 140 then forwards the request to the appropriate processing node(s) and waits for a response.

In some cases, the endpoint proxy manager 140 may implement security measures to protect against unauthorized access or data breaches. For example, the endpoint proxy manager 140 may implement authentication and authorization mechanisms to ensure that only authorized external entities are able to access the distributed endpoint processing system 100 and its resources. The endpoint proxy manager 140 may include encryption or other security measures to protect sensitive data and prevent it from being intercepted or compromised during transmission.

Figure 2:
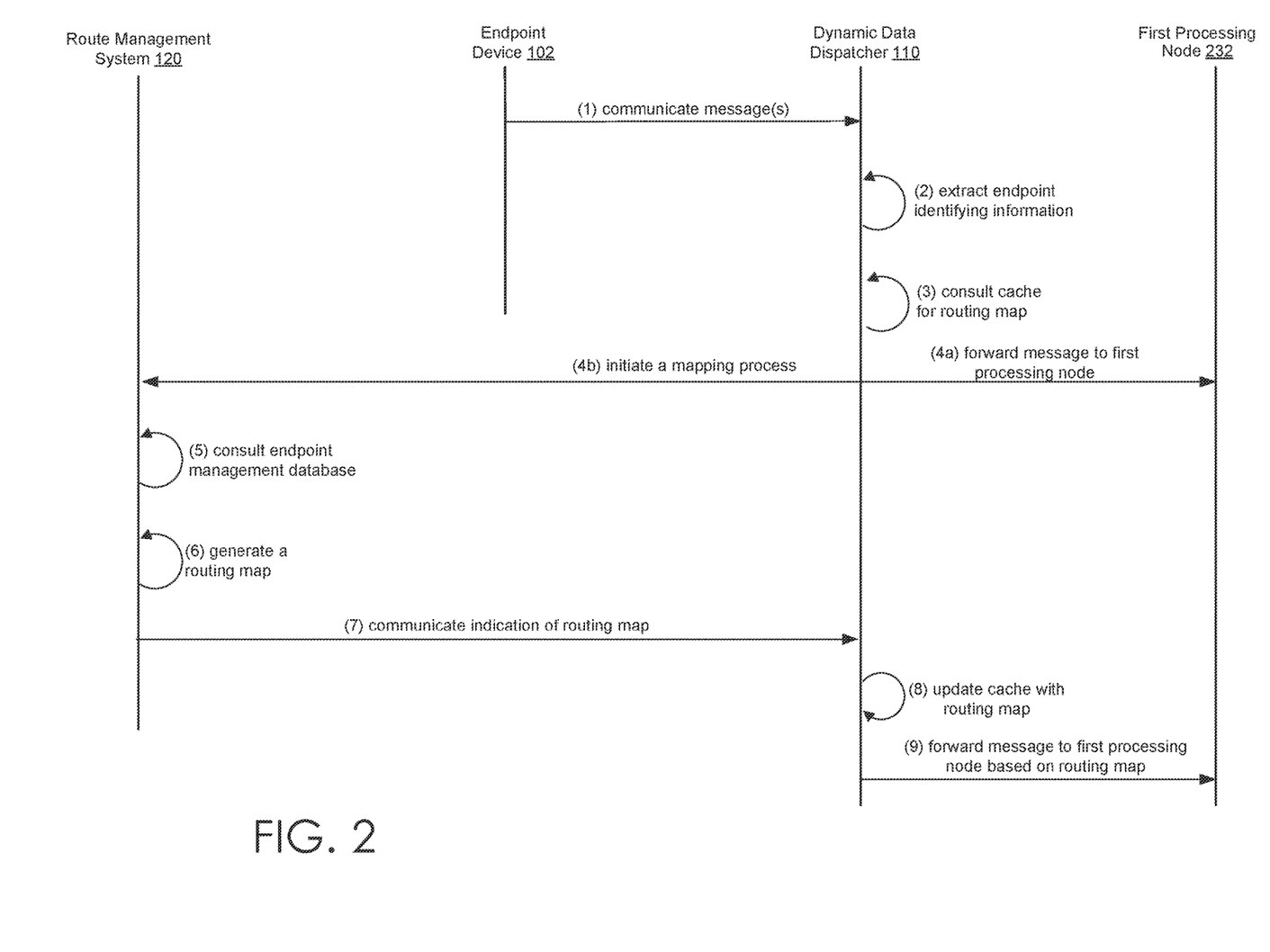
FIG. 2 is a data flow diagram illustrating an embodiment of data flow and communications between various components in the distributed endpoint processing system for managing and processing messages from endpoint devices.

FIG. 2 is a data flow diagram illustrating an embodiment of data flow and communications between various components in the distributed endpoint processing system 100 for managing and processing messages from endpoint devices 102. The data flow diagram of FIG. 2 demonstrates an example of data flow and communications between the endpoint device 102, the dynamic data dispatcher 110, the route management system 120, and a first processing node 232. It will be understood that, in some embodiments, one or more of the functions described herein with respect to FIG. 2 can be omitted, performed concurrently or in a different sequence, and/or carried out by another component of the distributed endpoint processing system 100. Accordingly, the illustrated embodiment and description should not be construed as limiting.

At (1), the dynamic data dispatcher 110 obtains communications from the endpoint device 102. These communications may include data, requests, or other messages sent by the endpoint device 102. In some cases, the dynamic data dispatcher 110 may collect this information in response to a new endpoint device being introduced or initiated within the distributed endpoint processing system 100. For example, when introduced within the distributed endpoint processing system 100, the endpoint device 102 can broadcast messages. The communications obtained by the dynamic data dispatcher 110 can include endpoint identifying information, as described herein.

At (2), the dynamic data dispatcher 110 extracts the endpoint identifying information from the communications received from the endpoint device 102. The dynamic data dispatcher 110 can use various techniques to extract the endpoint identifying information, depending on the format and structure of the incoming messages. For example, the dynamic data dispatcher 110 can use parsing algorithms to extract the endpoint identifying information from specific fields within the message(s), or it may use pattern recognition algorithms to identify and extract the relevant information from unstructured message data.

At (3), the dynamic data dispatcher 110 consults the data store 112, which can include a cache of routing maps stored in the route management database 122. The data store 112 can allow the dynamic data dispatcher 110 to quickly access routing information without requiring communication with the route management system 120 each time it receives communications from endpoint devices.

At (4a), the dynamic data dispatcher 110 identifies a routing map in the data store 112 and forwards the communications to the appropriate processing node (in this case, the first processing node 320). Interaction (4a) can be executed when the dynamic data dispatcher 110 finds a routing map for the endpoint device in the data store 112 that corresponds to the received communications. By using the cached routing information, the dynamic data dispatcher 110 can efficiently route communications without requiring communication with the route management system 120. This can help to reduce latency and improve system performance.

At (4b), the dynamic data dispatcher 110 is unable to find a mapping for the endpoint device in the data store 112 and communicates with the route management system 120 (e.g., the platform manager 124) to initiate a mapping process to create a new routing map. Interaction (4b) can be executed when the dynamic data dispatcher 110 cannot find a mapping for the endpoint device in the data store 112. For example, the dynamic data dispatcher 110 can communicate with the route management system 120 to obtain routing information. As part of the communication, the dynamic data dispatcher 110 may forward the communication itself or may send information about the communication that it received from the endpoint device 102, such as the endpoint identifying information and/or any relevant details about the communication itself (e.g., data, requests, etc.).

The route management system 120 can generate the routing map that includes routing information and provide it to the dynamic data dispatcher 110, which can store the routing map in the data store 112 for future use. Once a mapping has been established, the dynamic data dispatcher 110 can use the routing information to forward the communications to the appropriate processing node 132 for processing. By creating new mappings as necessary, the distributed endpoint processing system 100 can efficiently handle the addition of new endpoint devices and adapt to changes in the distributed endpoint processing system 100.

In some cases, at interaction (4b), the dynamic data dispatcher 110 may be able to identify a routing map in the route management database 122 itself, without requiring communication with the route management system 120. For example, if the endpoint identifying information is sufficient to identify an existing mapping in the route management database 122, the dynamic data dispatcher 110 may retrieve the routing information from the route management database 122 directly. This can allow the dynamic data dispatcher 110 to quickly obtain the routing information and forward the communications to the appropriate processing node 132 for processing, without having to initiate a routing map process with the route management system 120. When the dynamic data dispatcher 110 finds a routing map for the endpoint device in the route management database 122, the dynamic data dispatcher 110 can forward the communications to the appropriate processing node. In cases where the routing information is not available in the data store 112 or the route management database 122, the dynamic data dispatcher 110 may communicate with the route management system 120 to obtain the mapping information.

At (5), the route management system 120 receives the communication from the dynamic data dispatcher 110 and consults the route management database 122 to determine whether a routing map exists for the endpoint device 102. The routing maps indicate which processing node or nodes have been assigned to handle communications from the endpoint device. If a routing map exists, the route management system 120 sends the routing information to the dynamic data dispatcher 110, which then forwards the communication to the appropriate processing node for processing (similar to interaction 3a). If no routing map exists for the endpoint device in question, the route management system 120 proceeds to interaction (5) to assign the endpoint device to a processing node.

At (6), the route management system 120 generates a routing map to assign a processing node to handle communications from the endpoint device 102. The route management system 120 uses a routing map generation policy to determine how to generate the routing map. For example, the routing map generation policy indicates how to choose assignments of endpoint devices to processing nodes. The routing map generation policy can include various routing rules, instructions, or criteria to identify the processing node(s) that should be assigned to handle communication from a specific endpoint device.

As an example, in some cases, the routing map generation policy includes endpoint-based routing rule, where the routing map generation policy indicates that processing nodes are assigned to endpoint devices based on metadata received from the endpoint device 102. This metadata can include information such as, but not limited to, the radio endpoint ID, customer ID string, device type, meter type, product type, or firmware version. An example of an endpoint-based routing rule that could be included in the routing map generation policy is to assign processing nodes based on the device type metadata received from the endpoint device 102. For instance, if the endpoint device 102 belongs to a family of related endpoint devices, the routing map generation policy might indicate to assign all endpoint devices within that family to a specific processing node to ensure consistent processing. As another example, the routing map generation policy might indicate to assign the endpoint to a processing node that is geographically closer to the customer's location based on the customer ID string, thereby reducing latency and improving response times. As another example, the routing map generation policy might specify that the endpoint should be assigned to a processing node that has expertise in processing that type of data based on the endpoint's meter type or product type. As another example, the routing map generation policy might indicate to assign the endpoint to a processing node that has the latest software updates and can handle the up-to-date communication protocols based on the endpoint's firmware version. By using endpoint metadata in this way, the route management system 120 can ensure that communications and data from each endpoint are handled efficiently and effectively, improving the overall performance of the distributed endpoint processing system 100.

As an example, in some cases, the routing map generation policy includes processing node-based routing rules, where the route management system 120 assigns a processing node based on processing node data received from the first processing node 320 or other processing nodes. This data can include information about the processing capacity, available resources, workload, and location of the processing node(s). The routing map generation policy may also include specific criteria or instructions for processing node assignment, such as not assigning a processing node if it exceeds a threshold workload (e.g., 95% utilization). The route management system 120 can use this information to determine which processing node is best suited to handle the communication from the endpoint device 102. For instance, a processing node-based routing rule could be implemented where the route management system 120 only assigns a processing node to an endpoint device if the processing node's workload is below a certain threshold (e.g., 80%). Such a rule can ensure that the processing node doesn't become overwhelmed and the communication between endpoint devices and processing nodes remain efficient. Additionally, the route management system 120 may assign a processing node that is geographically closer to the endpoint device in question, reducing latency and improving response times.

As another example, the routing map generation policy can specify the use of round-robin or random assignment methods to distribute processing nodes among endpoint devices, or it may not specify a particular order for assigning processing nodes to endpoint devices. In some cases, a routing map may associate multiple processing nodes to the same endpoint device, with tiered assignments where one assignment takes precedence over the other assignment, such as assigning the first processing node as the primary assignment, and one or more second processing nodes as secondary assignments in case the first processing node fails or becomes unavailable. By using a routing map generation policy and routing rules, the route management system 120 can effectively assign processing nodes to handle communications from endpoint devices, ensuring that the distributed endpoint processing system 100 operates efficiently and effectively.

The routing map generation policy can be customized (e.g., in real- or near-real time) to include a combination of routing rules, instructions, or criteria, which can be used to determine the processing node(s) that should handle communication from a specific endpoint device. For instance, the routing map generation policy may include both endpoint-based and processing node-based routing rules, allowing for a more nuanced and flexible approach to assigning endpoint devices to processing nodes. In addition, a round-robin or random assignment method could be used to balance the workload across processing nodes. The routing map generation policy may also specify that multiple criteria be used together to make an assignment decision, such as assigning endpoint devices to processing nodes based on both device type and customer location. By utilizing a combination of routing rules, the routing map generation policy can be tailored to the specific needs and requirements of the distributed endpoint processing system 100, improving assignments of endpoint devices to processing nodes.

Consider a scenario in which a new endpoint device with specific characteristics, such as new firmware, is to be integrated into the distributed endpoint processing system 100. In such a scenario, the routing map generation policy can be updated without needing to restart the processing nodes. For example, system administrators or other authorized personnel can review the unique requirements of the new endpoint device and modify the routing map generation policy accordingly. For instance, they may introduce new routing rules or criteria that take into account the specific firmware or other characteristics of the new device. During runtime of the processing nodes, the routing map generation policy can be adjusted to accommodate the new endpoint device's distinct firmware requirements. This update ensures that the appropriate routing rules, instructions, or criteria are in place to effectively route the new endpoint device to the suitable processing node. Once the routing map generation policy is updated, the new endpoint device is then added to the system, and based on the modified policy, it is assigned to the appropriate processing node. The capability to update the routing map generation policy and seamlessly integrate the new endpoint device during runtime allows for efficient and continuous operation of the processing nodes, minimizing downtime and ensuring that the distributed endpoint processing system remains adaptable to evolving endpoint requirements.

At step (7), the route management system 120 communicates an indication of the routing map to the dynamic data dispatcher 110. This indication can include a device identifier associated with the endpoint device 102 and/or a processing node identifier indicating the processing node assigned to handle communications from the endpoint device 102. In some implementations, the route management system 120 may update the route management database 122 with the routing map information, which can then be used by the dynamic data dispatcher 110 to update its own database. In other implementations, the route management system 120 may directly communicate the routing map information to the dynamic data dispatcher 110.

At (8), upon receiving the routing map from the route management system 120, the dynamic data dispatcher 110 uses the information in the routing map to update its data store 112 to reflect the new routing map.

At (9), the dynamic data dispatcher 110 forwards the messages from the endpoint device 102 to the first processing node. In some cases, when the dynamic data dispatcher 110 receives incoming messages at interaction (1) and the route management system 120 has not yet provided the routing map, the dynamic data dispatcher 110 may hold or queue these messages instead of immediately forwarding them to the appropriate processing node. This is because the dynamic data dispatcher 110 relies on the routing map to identify the appropriate processing node and ensure that the communication is efficiently and accurately routed. By queuing the incoming messages, the dynamic data dispatcher 110 can avoid forwarding the messages to the wrong processing node or losing the messages altogether. Once the route management system 120 provides the routing map, the dynamic data dispatcher 110 uses this information to forward the queued messages to the appropriate processing node for processing. This helps ensure that communications and data are efficiently and accurately routed within the distributed endpoint processing system 100.

In certain cases, the dynamic data dispatcher 110 can use incoming messages received at interaction (1) to trigger the generation of a new routing map, as detailed herein. However, in some instances, the dynamic data dispatcher 110 does not retain or queue these messages. Instead, the dynamic data dispatcher 110 may discard the messages if no association is found in the data store 112. Once the data store 112 is updated to incorporate the new routing map, any subsequent messages received from the same endpoint device will be routed accordingly. This approach can enable the dynamic data dispatcher 110 to efficiently manage the flow of messages within the distributed endpoint processing system 100, while ensuring accurate and timely routing of communications and data.

Figure 3:
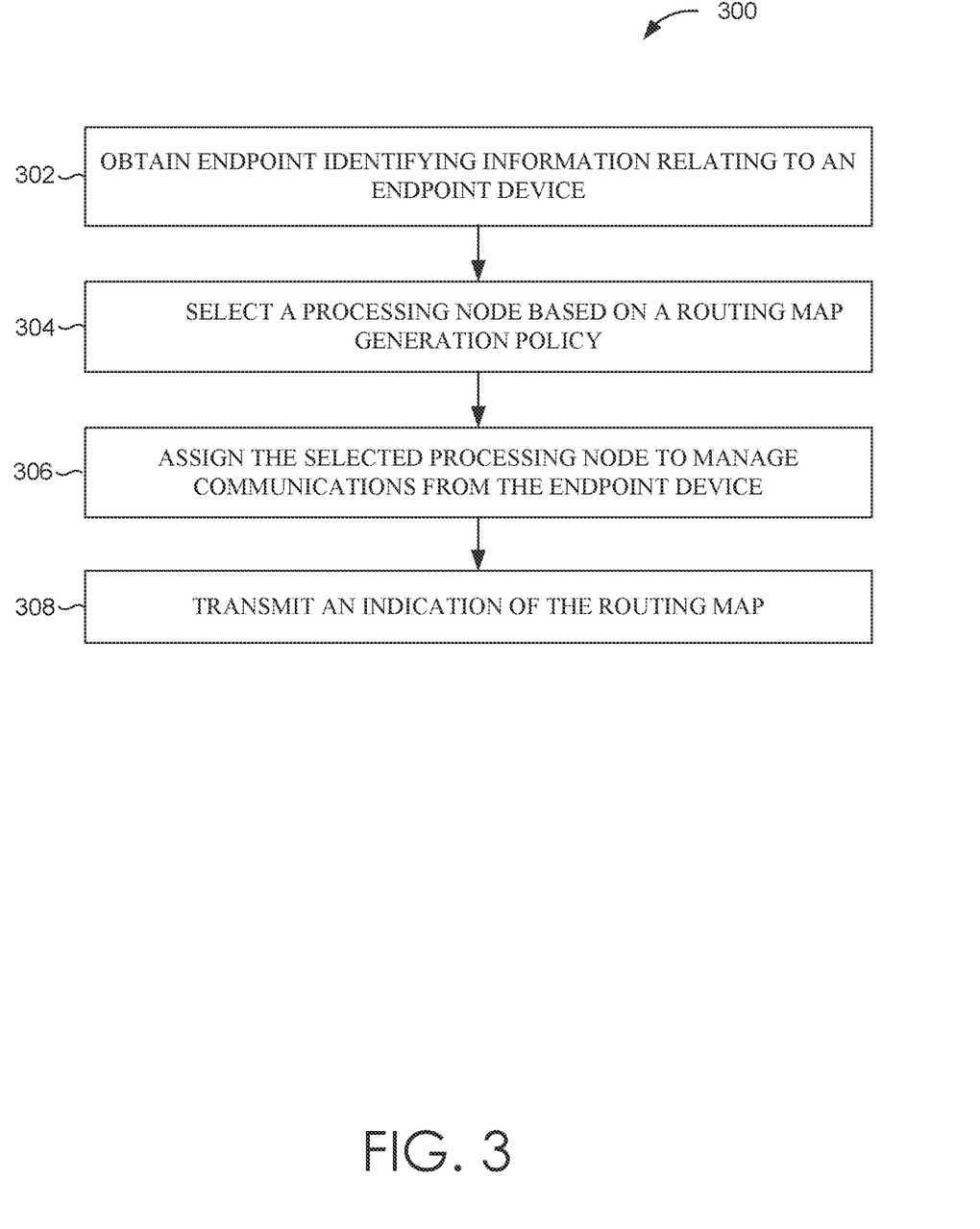
FIG. 3 is a flow diagram illustrating an embodiment of a routine implemented by a computing device within the distributed endpoint processing system.

Fewer, more, or different blocks can be used as part of the routine 200. In some cases, one or more blocks can be omitted. For example, the dynamic data dispatcher may not extract endpoint identifying information prior to communicating with the endpoint route management system, update its cache with the routing map, and/or forward the message to the first processing node. In some embodiments, the blocks of routine 300 can be combined with any one or any combination of blocks described herein. For example, in some embodiments, the endpoint route management system 120 and the dynamic data dispatcher 110 may be combined.

FIG. 3 is a flow diagram illustrating an embodiment of a routine 300 implemented by a computing device within the distributed endpoint processing system 100. While described as being executed by the route management system 120, it should be understood that the elements outlined for routine 300 can be implemented by one or more computing devices or components associated with the distributed endpoint processing system 100, such as, but not limited to, one or more endpoint devices 102, the dynamic data dispatcher 110, the route management database 122, or the endpoint processing system 130. Consequently, the following illustrative embodiment should be regarded as non-limiting. Additionally, the routine 300 can include fewer, more, or different blocks, depending on the specific implementation.

At block 302, the route management system 120 obtains endpoint identifying information that is indicative of at least one of an identity or a characteristic of an endpoint device within a distributed endpoint processing system. As described herein, the endpoint identifying information can be broadcasted by the endpoint device as a part of one or more messages in response to introduction of the endpoint device into the distributed endpoint processing system.

The endpoint identifying information can include metadata such as the radio endpoint ID, customer ID string, device type, meter type, product type, or firmware version, which allows the route management system 120 to identify the specific endpoint device and its properties. In some cases, the message is received by the dynamic data dispatcher 110, and the dynamic data dispatcher 110 extracts the endpoint identifying information from the message(s) and communicates the endpoint identifying information to the route management system 120. In some cases, the route management system 120 can extract this information from the message and use it to determine how to assign the endpoint device to a processing node. In some cases, the endpoint identifying information may also be used to determine whether the endpoint device is authorized to communicate with the distributed endpoint processing system 100 and whether it complies with any security or other requirements.

To ensure the accuracy and efficiency of endpoint assignment, the route management system 120 may also verify the integrity and authenticity of the endpoint identifying information received from the endpoint device. For example, the route management system 120 can use cryptographic techniques such as digital signatures or certificates to authenticate the message sender and ensure that the message has not been tampered with during transmission. The route management system 120 may also compare the received endpoint identifying information with a trusted database or registry to verify its accuracy and completeness.

At block 304, the route management system 120 selects a processing node based on a routing map generation policy. As described herein, the routing map generation policy can include routing rules, instructions, or criteria for determining which processing node(s) should handle communication from the endpoint device based on the endpoint identifying information and/or based on processing node information. The routing map generation policy can be customized to include various types of routing rules, such as endpoint-based routing rules or processing node-based routing rules. Endpoint-based routing rules may use the endpoint identifying information to assign the endpoint device to a processing node that is best suited to handle communications from that device. Processing node-based routing rules, on the other hand, may use information about the processing capacity, available resources, workload, and location of the processing node(s) to determine which node is best suited to handle the communication from the endpoint device.

In addition, the routing map generation policy may specify various criteria that can be used to assign the endpoint device to a processing node, such as device type, customer location, or service level agreements. By using a combination of routing rules and criteria, the route management system 120 can ensure that the endpoint device is assigned to a processing node in a manner that is efficient and effective. The routing map generation policy may also be updated or modified based on changes in the distributed endpoint processing system 100 or in response to feedback or analytics data, allowing the route management system 120 to adapt to changing conditions and optimize the assignment of endpoint devices to processing nodes. For example, prior to obtaining endpoint identifying information and during runtime of the plurality of processing nodes, the route management system 120 can obtain an indication of a second routing map generation policy and can replace or modify a first routing map generation policy to generate the second routing map generation policy. Prior to obtaining the indication of the second routing map generation policy, one or more routing map can be generated according to the first routing map generation policy.

At block 306, the route management system 120 assigns the selected processing node to manage communications from the endpoint device. In some cases, the assign the selected node, the route management system 120 generates a routing map that assigns a processing node to the endpoint device based on the routing map generation policy. The routing map can be dynamically generated based on a current state of the distributed endpoint processing system 100 and the endpoint identifying information. The routing map may include information such as the endpoint identifier and the processing node identifier assigned to handle communication from the endpoint device.

At block 308, the route management system 120 communicates the routing map to a dynamic data dispatcher 110, which updates its cache to reflect the new routing map. The dynamic data dispatcher 110 uses this information to determine the processing node that should handle the communication from the endpoint device. In some cases, the dynamic data dispatcher 110 may queue incoming messages received at interaction (1) while waiting for the route management system 120 to generate and provide the routing map. Once the routing map is received, the dynamic data dispatcher 110 updates its cache accordingly to ensure proper routing of communications and data. Alternatively, the dynamic data dispatcher 110 may discard incoming messages if no association is found in the local data store. If the cached information is no longer accurate or up-to-date, the dynamic data dispatcher 110 can request a new routing map from the route management system 120.

Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. In certain embodiments, one or more of the components of the distributed endpoint processing system 100 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a distributed endpoint processing system 100 by managing computing resources configured to implement various aspects of the system and by providing access to the system to end users via a network.

When implemented as a cloud-based service, various components of the distributed endpoint processing system 100 can be implemented using containerization or operating-system-level virtualization, or other virtualization technique. For example, one or more components of the distributed endpoint processing system 100 can be implemented as separate software containers or container instances. Each container instance can have certain resources (e.g., memory, processor, etc.) of the underlying host computing system assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain Claim forms, but the applicant contemplates other aspects of the invention in any number of Claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method comprising:
   applying a first set of processing node assignments, the first set having been generated based on a first routing map generation policy and specifying, for each endpoint device of a plurality of endpoint devices in a distributed endpoint processing system, a corresponding processing node to which communications from that endpoint device are to be routed for processing within the distributed endpoint processing system;
   obtaining, during runtime operation of the distributed endpoint processing system, a second routing map generation policy that comprises a modified set of rules for assigning the endpoint devices of the of the distributed endpoint processing system to processing nodes based on endpoint identifying information associated with each endpoint device and processing node information associated with each of a plurality of processing nodes;
   applying, during runtime operation of the distributed endpoint processing system, the second routing map generation policy to generate a second set of processing node assignments for the plurality of endpoint devices, wherein the second set of processing node assignments replaces the first set of processing node assignments and specifies, for each endpoint device of the plurality of endpoint devices, a corresponding processing node selected in accordance with the second routing map generation policy;
   obtaining endpoint identifying information that is indicative of at least one of an identity or a characteristic of a first endpoint device in the distributed endpoint processing system, wherein the endpoint identifying information is broadcasted by the first endpoint device as a part of one or more messages in response to introduction of the first endpoint device into the distributed endpoint processing system;
   selecting, based on the second routing map generation policy, the endpoint identifying information, and processing node information, a processing node from among the plurality of processing nodes to which communications from the first endpoint device are to be routed, wherein the second routing map generation policy provides guidelines for utilizing the endpoint identifying information and the processing node information, wherein the processing node information comprises at least one of processing capacity information, workload information, or geographical location information relating to one or more of the plurality of processing nodes;
   assigning the selected processing node to manage communications from the first endpoint device, wherein the assigning comprises generating a routing map entry that associates the selected processing node with the first endpoint device; and
   routing communications from the first endpoint device to the selected processing node within the distributed endpoint processing system.

2. The method of claim 1, wherein none of the plurality of processing nodes are required to restart in order to accommodate replacing or modifying the first routing map generation policy with the second routing map generation policy.

3. The method of claim 1, further comprising receiving the one or more messages and extracting the endpoint identifying information from the one or more messages.

4. The method of claim 1, wherein the first endpoint device comprises at least one of a sensor, meter, monitoring equipment, control equipment, or communication device configured to collect, analyze, or transmit data within the distributed endpoint processing system.

5. The method of claim 1, further comprising acquiring real-time metrics associated with the plurality of processing nodes, wherein the processing node information comprises the real-time metrics.

6. The method of claim 1, the method further comprising prior to selecting the processing node, consulting a database storing existing routing maps that associate endpoint devices with respective processing nodes of the plurality of processing nodes, wherein the selecting the processing node is based on an absence of an entry for the first endpoint device in the database.

7. The method of claim 1, further comprising maintaining a route management database for all endpoint devices in the distributed endpoint processing system, wherein the route management database includes associations between specific endpoint devices and corresponding processing nodes of the plurality of processing nodes.

8. The method of claim 1, wherein the method is executed without necessitating software restart or revalidation.

9. The method of claim 1, wherein a dynamic data dispatcher receives the one or more messages from the first endpoint device and extracts the endpoint identifying information.

10. The method of claim 1, further comprising transmitting an indication of the routing map entry to a dynamic data dispatcher, wherein the dynamic data dispatcher updates its cache to include the indication of the routing map entry, and wherein for subsequent communications from the first endpoint device, the dynamic data dispatcher forwards the subsequent communications to the processing node based on the routing map entry.

11. The method of claim 1, wherein the endpoint identifying information includes at least one of an endpoint device identifier, a device type, a firmware version, or a customer location.

12. The method of claim 1, wherein the second routing map generation policy specifies that processing nodes are selected based on a balance of processing capacity across the plurality of processing nodes.

13. The method of claim 1, wherein the routing map generation policy specifies that processing nodes are selected based on geographical proximity to the first endpoint device.

14. The method of claim 1, wherein the routing map generation policy specifies that processing nodes are selected based on device type of the first endpoint device.

15. The method of claim 1, wherein the routing map generation policy specifies that processing nodes are selected based on a combination of processing capacity, geographical proximity, and device type.

16. A system for managing communications within a distributed endpoint processing system, the system comprising a processor configured to:
apply a first set of processing node assignments, the first set having been generated based on a first routing map generation policy and specifying, for each endpoint device of a plurality of endpoint devices in a distributed endpoint processing system, a corresponding processing node to which communications from that endpoint device are to be routed for processing within the distributed endpoint processing system;
obtain, during runtime operation of the distributed endpoint processing system, a second routing map generation policy that comprises a modified set of rules for assigning the endpoint devices of the of the distributed endpoint processing system to processing nodes based on endpoint identifying information associated with each endpoint device and processing node information associated with each of a plurality of processing nodes;
apply, during runtime operation of the distributed endpoint processing system, the second routing map generation policy to generate a second set of processing node assignments for the plurality of endpoint devices, wherein the second set of processing node assignments replaces the first set of processing node assignments and specifies, for each endpoint device of the plurality of endpoint devices, a corresponding processing node selected in accordance with the second routing map generation policy;
obtain endpoint identifying information that is indicative of at least one of an identity or a characteristic of a first endpoint device in the distributed endpoint processing system, wherein the endpoint identifying information is broadcasted by the first endpoint device as a part of one or more messages in response to introduction of the first endpoint device into the distributed endpoint processing system;
select, based on the second routing map generation policy, the endpoint identifying information, and processing node information, a processing node from among the plurality of processing nodes to which communications from the first endpoint device are to be routed, wherein the second routing map generation policy provides guidelines for utilizing the endpoint identifying information and the processing node information, wherein the processing node information comprises at least one of processing capacity information, workload information, or geographical location information relating to one or more of the plurality of processing nodes;
assign the selected processing node to manage communications from the first endpoint device, wherein the assigning comprises generating a routing map entry that associates the selected processing node with the first endpoint device; and
route communications from the first endpoint device to the selected processing node within the distributed endpoint processing system.

17. Non-transitory computer readable media comprising computer-executable instructions that, when executed by a computing system of a distributed endpoint processing system, cause the computing system to:
apply a first set of processing node assignments, the first set having been generated based on a first routing map generation policy and specifying, for each endpoint device of a plurality of endpoint devices in a distributed endpoint processing system, a corresponding processing node to which communications from that endpoint device are to be routed for processing within the distributed endpoint processing system;
obtain, during runtime operation of the distributed endpoint processing system, a second routing map generation policy that comprises a modified set of rules for assigning the endpoint devices of the of the distributed endpoint processing system to processing nodes based on endpoint identifying information associated with each endpoint device and processing node information associated with each of a plurality of processing nodes;
apply, during runtime operation of the distributed endpoint processing system, the second routing map generation policy to generate a second set of processing node assignments for the plurality of endpoint devices, wherein the second set of processing node assignments replaces the first set of processing node assignments and specifies, for each endpoint device of the plurality of endpoint devices, a corresponding processing node selected in accordance with the second routing map generation policy;
obtain endpoint identifying information that is indicative of at least one of an identity or a characteristic of a first endpoint device in the distributed endpoint processing system, wherein the endpoint identifying information is broadcasted by the first endpoint device as a part of one or more messages in response to introduction of the first endpoint device into the distributed endpoint processing system;
select, based on the second routing map generation policy, the endpoint identifying information, and processing node information, a processing node from among the plurality of processing nodes to which communications from the first endpoint device are to be routed, wherein the second routing map generation policy provides guidelines for utilizing the endpoint identifying information and the processing node information, wherein the processing node information comprises at least one of processing capacity information, workload information, or geographical location information relating to one or more of the plurality of processing nodes;

assign the selected processing node to manage communications from the first endpoint device, wherein the assigning comprises generating a routing map entry that associates the selected processing node with the first endpoint device; and route communications from the first endpoint device to the selected processing node within the distributed endpoint processing system.

18. The method of claim 1, wherein, throughout the obtaining and applying of the second routing map generation policy, the assigning of the selected processing node, and the routing of communications from the first endpoint device, the plurality of processing nodes remain operational without requiring restart, reinitialization, or suspension of processing operations.

\* \* \* \* \*